(12) United States Patent
Clarke et al.

(10) Patent No.: US 7,214,443 B2
(45) Date of Patent: May 8, 2007

(54) SECONDARY BATTERY WITH AUTOLYTIC DENDRITES

(75) Inventors: Robert Lewis Clarke, Orinda, CA (US); Brian Dougherty, Menlo Park, CA (US); Stephen Harrison, Benicia, CA (US); Peter J. Millington, Weaverham (GB); Samaresh Mohanta, Fremont, CA (US)

(73) Assignee: Plurion Limited, Glasgow (GB)

( * ) Notice: Subject to any disclaimer, the term of this patent is extended or adjusted under 35 U.S.C. 154(b) by 347 days.

(21) Appl. No.: 10/484,581

(22) PCT Filed: Feb. 12, 2002

(86) PCT No.: PCT/US02/04748
§ 371 (c)(1),
(2), (4) Date: May 24, 2004

(87) PCT Pub. No.: WO03/028127
PCT Pub. Date: Apr. 3, 2003

(65) Prior Publication Data
US 2004/0202926 A1      Oct. 14, 2004

(51) Int. Cl.
*H01M 4/36*      (2006.01)
(52) U.S. Cl. ........................... 429/101; 429/105
(58) Field of Classification Search ............... 429/107, 429/221, 204, 207, 105, 122, 205, 213, 220, 429/224, 303, 306, 101; 204/104, 105, 108, 204/112, 112
See application file for complete search history.

(56) References Cited

U.S. PATENT DOCUMENTS

| 2,985,702 | A | * | 5/1961  | Darland, Jr. et al. ........ 429/114 |
| 3,793,079 | A |   | 2/1974  | Brown et al. |
| 3,811,946 | A |   | 5/1974  | Creutz, et al. |
| 4,040,916 | A |   | 8/1977  | Will et al. |
| 4,074,028 | A |   | 2/1978  | Will |
| 4,784,924 | A |   | 11/1988 | Savinell et al. |
| 4,814,241 | A |   | 3/1989  | Nagashima et al. |
| 5,061,578 | A |   | 10/1991 | Kozuma et al. |
| 5,318,865 | A |   | 6/1994  | Kaneko et al. |

(Continued)

OTHER PUBLICATIONS

Nafion, Wikipedia, The Free Encyclopedia at http://en.wikipedia.org/wiki/Nafion.*
Iwasa, et al., Fundamental Studies on the Electrolyte Solutions of Novel Redox Flow Battery for Electricity Storage, 2001.
Fang, et al., A Study of the Ce(III)Ce(IV) Redox Couple For Redox Flow Battery Application, Apr. 8, 2002.

*Primary Examiner*—Patrick Joseph Ryan
*Assistant Examiner*—Monique Wills
(74) *Attorney, Agent, or Firm*—Fish & Associates, PC

(57) ABSTRACT

A battery (100) comprises a cell having a cathode compartment (120) that includes an element that is oxidized during charging of the battery (100), wherein the oxidized element forms a salt with an acid and thereby increases the H+ concentration in the cathode compartment (120) sufficient to promote an H+ flux into the anode compartment (110) across the separator (130), wherein the H+ flux across the separator (130) is sufficient to disintegrate a zinc dendrite proximal to the separator (130).

14 Claims, 1 Drawing Sheet

U.S. PATENT DOCUMENTS

| | | |
|---|---|---|
| 5,366,824 A | 11/1994 | Nozaki et al. |
| 5,478,448 A * | 12/1995 | Schneider .................. 205/554 |
| 5,610,802 A | 3/1997 | Eidler et al. |
| 5,650,239 A * | 7/1997 | Lex et al. ..................... 429/49 |
| 5,851,694 A | 12/1998 | Miyabayashi et al. |
| 6,468,688 B2 | 10/2002 | Kazacos et al. |
| 6,475,661 B1 | 11/2002 | Pellegri et al. |
| 6,613,298 B2 | 9/2003 | Tanaka et al. |
| 6,652,819 B2 | 11/2003 | Shiroto et al. |
| 6,692,862 B1 | 2/2004 | Zocchi |
| 2002/0146618 A1* | 10/2002 | Licht .......................... 429/107 |

* cited by examiner

SECONDARY BATTERY WITH AUTOLYTIC DENDRITES

FIELD OF THE INVENTION

The field of the invention is batteries, and especially secondary batteries in which zinc forms a redox couple with a second element.

BACKGROUND OF THE INVENTION

Many types of secondary batteries and other power cells are known, based upon a relatively wide range of electrical couples, and among the most popular electrical couples are those containing zinc.

For example, zinc may form a redox pair with nickel to provide a rechargeable redox system. While many rechargeable zinc/nickel batteries frequently exhibit a relatively good power to weight ratio, several problems of the zinc/nickel redox pair persist. Among other difficulties, such batteries tend to have a comparably poor cycle life of the zinc electrode. Moreover, nickel is known to be a carcinogen in water-soluble form, and is thus problematic in production and disposal.

To circumvent at least some of the problems with toxicity, zinc maybe combined with silver oxide to form a secondary battery. Rechargeable zinc/silver batteries often have a relatively high energy and power density. Moreover, such batteries typically operate efficiently at extremely high discharge rates and generally have a relatively long dry shelf life. However, the comparably high cost of the silver electrode generally limits the use of zinc/silver batteries to applications where high energy density is a prime requisite.

In a further, relatively common secondary battery, zinc is replaced by cadmium and forms a redox couple with nickel. Such nickel/cadmium batteries are typically inexpensive to manufacture, exhibit a relatively good power to weight ratio, and require no further maintenance other than recharging. However, cadmium is a known toxic element, and thereby further increases the problems associated with health and environmental hazards. Thus, despite the relatively widespread use of secondary batteries numerous problems, and especially problems associated with toxicity and/or relatively high cost persist.

Still further, all or almost all of the known secondary batteries need to be operated over several charge/discharge cycles under conditions in which the cathode compartment is separated from the anode compartment by a separator. Loss of the separation will typically result in undesired plating of one or more components of the electrolyte on the battery electrode and thereby dramatically decrease the performance of such batteries.

Unfortunately, zinc contained in most zinc containing electrolytes has the tendency to form zinc dendrites during charging, wherein dendrite growth typically proceeds towards the separator and frequently results in contact, if not even damage to the separator. Thus, prevention of zinc dendrite growth has received considerable attention over the recent years, and various approaches have been made to reduce the risk associated with dendrite growth.

In one approach, electrolyte additives are used to prevent dendrite formation. For example, in U.S. Pat. No. 3,793,079 the inventors describe addition of various organic compounds having an oxygen ether and a sulfonamide group to reduce dendrite formation. Alternatively, as described in U.S. Pat. No. 3,811,946 the reaction product of an amine and an aldehyde are employed as organic additives to reduce dendrite formation. Further known compositions for reduction of dendrites include benzotriazole, benzene sulfonamide, toluene sulfonamide, chlorotoluene sulfonamide and thiourea. However, while at least some of the known compounds work relatively well for their intended purpose, new difficulties arise. Among other things, at least some of the known compounds exhibit oxidation and/or decomposition by oxidizing agents in most rechargeable batteries. Furthermore, such compounds may interfere with reversibility of either electrode. Moreover, it has been found that some additives tend to precipitate or salt out during repeated recharging.

In another approach, surfactants may be employed to reduce dendrite formation as described, for example, in U.S. Pat. No. 4,074,028 and 4,040,916. Here, formation of a non-dendritic zinc layer is achieved by including 0.001 to 10 weight percent of a non-ionic surfactant additive (oxaalkyl or polyoxaalkyl perfluoroalkane sulfonamide) in the zinc-containing electrolyte. While surfactants may work satisfactorily for various electroplating and battery applications over a relatively short period, electrochemical (and other) degradation will eventually limit the usefulness of such compounds, especially in acid electrolytes.

Although numerous secondary batteries are known in the art, all or almost all of them suffer from one or more disadvantages. Particularly, the performance of known secondary batteries will significantly decrease when anolyte and catholyte of such batteries will inadvertently mix due to dendrite growth that damages the separator. Therefore, there is still a need to provide improved batteries.

SUMMARY OF THE INVENTION

The present invention is directed to a battery comprising a cathode and an anode compartment and a zinc-containing electrolyte, wherein the battery is configured such that zinc dendrites growing from the anode will disintegrate proximal to the separator that separates the cathode and the anode compartment.

Especially contemplated batteries include a cell with an acid electrolyte, wherein the cell is at least partially divided by a $H^+$ permeable separator into an anode compartment and a cathode compartment, wherein the acid electrolyte in the anode compartment comprises zinc, and wherein the acid electrolyte in the cathode compartment comprises an element that is oxidized during charging of the battery, wherein the oxidized element forms a salt with an acid, thereby increasing an $H^+$ concentration in the cathode compartment sufficient to promote an HI flux into the anode compartment across the separator, and wherein the $H^+$ flux across the separator is sufficient to disintegrate a zinc dendrite proximal to the separator.

In one aspect of the inventive subject matter, contemplated acid electrolytes comprise an organic acid or inorganic acid (e.g., methane sulfonic acid, trifluoromethane sulfonic acid, perchloric acid, nitric acid, hydrochloric acid, or sulfuric acid), and particularly preferred organic acids include methane sulfonic acid at a concentration of at least 2.5 to about 4M, and even higher. Preferred separators include those comprising a perfluorinated polymer that includes sulfonic and/or carboxylic groups.

In another aspect of the inventive subject matter, contemplated elements in the cathode compartment particularly include lanthanides, and especially preferred lanthanides include cerium, praseodymium, neodymium, terbium, and dysprosium. Thus, contemplated batteries will generally include an anode, a cathode, a separator, and an acid electrolyte in which zinc and a lanthanide form a redox pair, wherein the battery is configured such that during charging of the battery a H$^+$ flux is generated across the separator that disintegrates a zinc dendrite proximal to the separator.

Various objects, features, aspects, and advantages of the present invention will become more apparent from the following detailed description of preferred embodiments of the invention, along with the accompanying drawing.

DETAILED DESCRIPTION

Figure 1:
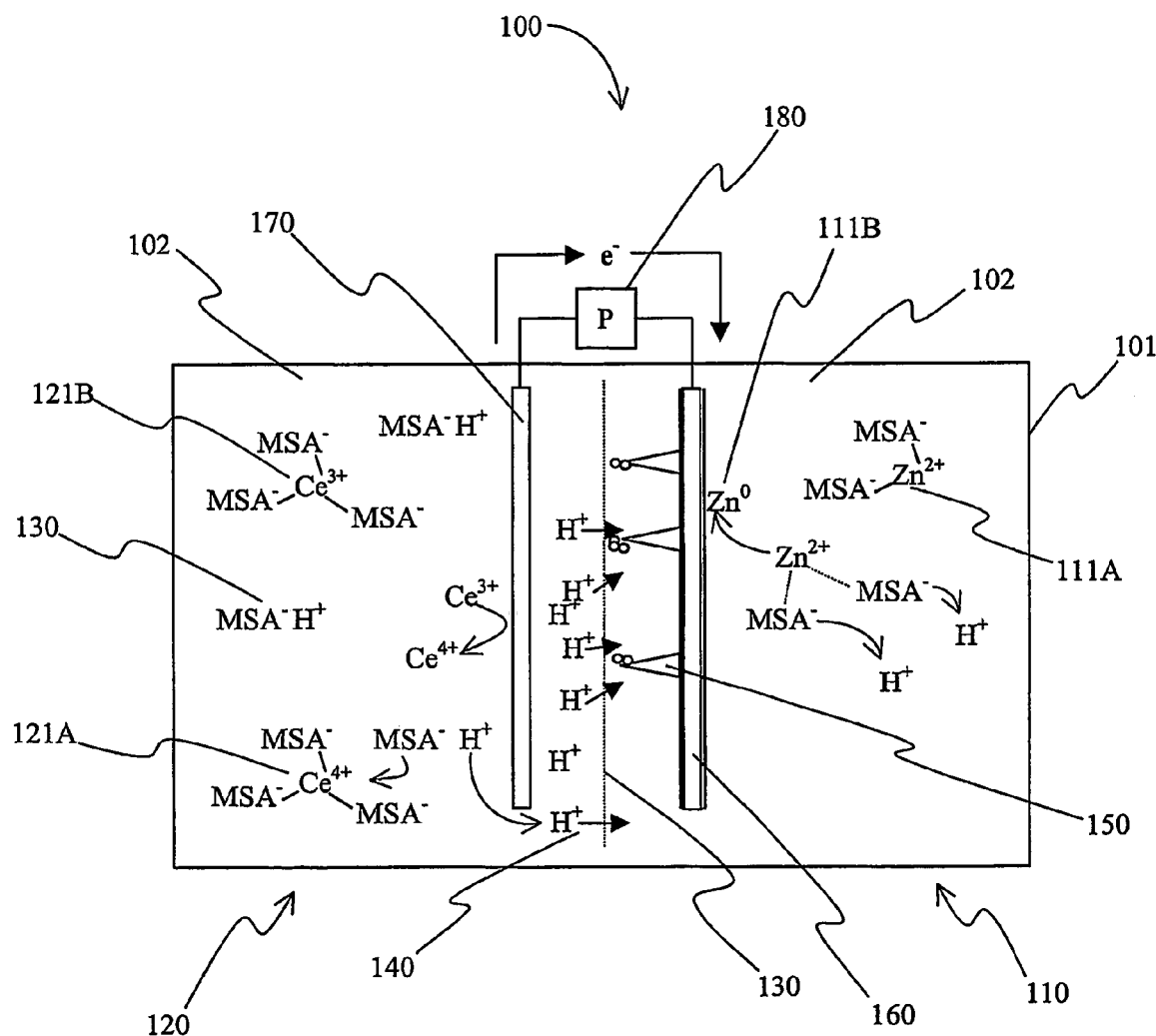
FIG. 1 is a schematic view of an exemplary battery during charge.

The inventors have discovered that a battery with a zinc-containing acid electrolyte can be manufactured such that dendrites growing from the anode during charging will disintegrate proximal to the separator of the battery.

As used herein, the term "anode" refers to the negative electrode of a battery (i.e., the electrode where oxidation occurs) during discharge of the battery. Thus, the term "anode compartment" refers to the battery compartment that includes the anode, and the term "anolyte" refers to the electrolyte in the anode compartment. Similarly, the term "cathode" refers to the positive electrode of a battery (i.e., the electrode where reduction occurs) during discharge of the battery. Thus, the term "cathode compartment" refers to the battery compartment that includes the cathode, and the term "catholyte" refers to the electrolyte in the cathode compartment.

As also used herein, the term "redox pair" is interchangeably used with the term "redox couple" and refers to a combination of a first element (or ion of the first element) and second element (or ion of the second element) in a battery, in which reduction of the first element and oxidation of the second element produce the current provided by the battery. The term "first element" as used herein refers to a chemical element that may be in ionic form as well as in non-ionic form. For example, a preferred first element is zinc, which may be present as metallic (e.g., plated) zinc as well as ionic zinc (e.g., as $Zn^{2+}$ in a salt with an anion of an organic acid).

Similarly, the term "second element" refers to a chemical element that may be in ionic form as well as in non-ionic form. For example, a preferred second element is cerium, which may be present in a first ionic form (e.g., $Ce^{3+}$ in a salt with an anion of an organic acid) as well as in a second ionic form (e.g., as $Ce^{4+}$ in a salt with an anion of an organic acid). Still further, it is generally contemplated that the first and second elements are chemically distinct, i.e., are not the same chemical element in a different oxidation state. Still further, it should be appreciated that the term element also includes combination of one element with a second (or more) elements to form a molecule. For example, suitable elements also include metal oxides or metal hydrides.

As still further used herein, the term "H$^+$-flux across the separator" refer to a net migration of H$^+$-ions through the separator, wherein the driving force of the migration includes at least one of a concentration gradient and an electrophoretic force (electrical attraction due to opposite electrical polarity). The term "proximal to the separator" as used herein refers to spatial proximity of an object (e.g., a dendrite) to the separator, wherein the object is generally located between the anode and the separator, and typically within 1 cm from the separator, more typically within 5 mm from the separator and most typically within 3 mm or less from the separator. Thus, the term proximal to the separator also includes contact of the object with the separator.

As still further used herein, the term "disintegrate the zinc dendrite" generally refers to changing the morphology of a zinc dendrite such that the changed zinc dendrite looses the ability to puncture or otherwise penetrate the separator. Most typically, the change of morphology will macroscopically manifest itself as a crumbling of a zinc dendrite, however, microscopic changes are also contemplated under the scope of this definition.

In a particularly preferred aspect of the inventive subject matter, an exemplary battery with autolytic dendrites is depicted in FIG. 1. Here, battery 100 has a cell 101 that is at least partially divided by separator 130 into an anode compartment 110 and a cathode compartment 120. Both anode and cathode compartments include methane sulfonic acid 130 in the acid electrolyte 102, wherein the anion of the methane sulfonic acid (MSA$^-$) complexes the ionic form of zinc ($Zn^{2+}$) 111A and cerium ($Ce^{3+/4+}$) 121B and 121A, respectively. The anode compartment 110 further comprises anode 160 that is at least partially covered by non-ionic plated metallic zinc ($Zn^0$). The cathode compartment 120 comprises cathode 170. Anode 160 and cathode 170 are electrically coupled to the power source 180, and the arrow above the load indicates the flow of the electrons from the anode to the cathode during charge of the battery. During charging, dendrites 150 form at the anode 160 towards the separator 130 and disintegrate under the H$^+$-flux 140 from the cathode compartment 120 to the anode compartment 110.

Thus, a particularly preferred battery may comprises a cell with an acid electrolyte, wherein the cell is at least partially divided by a H$^+$ permeable separator into an anode compartment and a cathode compartment, wherein the acid electrolyte in the anode compartment comprises zinc, and wherein the acid electrolyte in the cathode compartment comprises an element that is oxidized during charging of the battery, wherein the oxidized element forms a salt (i.e., forms a complex bond) with an acid, thereby increasing an H$^+$ concentration in the cathode compartment sufficient to promote an H$^+$ flux into the anode compartment across the separator, and wherein the H$^+$ flux across the separator is sufficient to disintegrate a zinc dendrite proximal to the separator. Viewed from another perspective, preferred batteries will include an anode, a cathode, a separator, and an acid electrolyte in which zinc and a lanthanide form a redox pair, wherein the battery is configured such that during charging of the battery a H$^+$ flux is generated across the separator that disintegrates a zinc dendrite proximal to the separator.

As used herein, the term "the battery is charged" refers to a process in which one element is reduced and the other element is oxidized by providing an electric current such that after charging reduction of one element and oxidation of the other element produces a current in the battery. Viewed from another perspective, the electrochemical redox reactions in the battery during discharge are reversed during charging by providing electric current to the battery.

It is generally contemplated that in batteries according to the inventive subject matter zinc will be dissolved into the electrolyte upon discharge of the battery, wherein at least some of the zinc ions will be complexed by an anion of an acid (e.g., methane sulfonic acid). Consequently, the proton of the acid will be replaced by a complex bond (i.e., a non-covalent, salt-like bond) with the zinc ion. During charging, at least some of the complexed zinc ions will receive electrons from the anode, and thus plate onto the anode. Similarly, cerium$^{3+}$ ions will be oxidized during charging to cerium$^{4+}$ ions, wherein the additional positive charge is compensated by a complex bond with an anion of an acid. Thus, oxidation of the cerium will concurrently liberate H$^+$ from the acid. Equations (I) and (II) below depict schematically the redox reactions during discharging and charging.

Discharging: $Zn^0-2e^-Zn^{+2}$ (I)

Discharging: $2Ce^{+4}+2e^-2Ce^{+3}$ (I)

Charging: $Zn^{+2}+2e^-Zn^0$ (II)

Charging: $2Ce^{+3}-2e^-2Ce^{+4}$ (II)

In an exemplary Zn/Ce redox system using methane sulfonic acid as one component in the electrolyte, it is contemplated that the following reactions occur during charging (the reactions are reversed on discharge):

Cathode: $2Ce(CH_3SO_3)_3+2CH_3SO_3H2Ce(CH_3SO_3)_4+2H+$

Anode: $Zn(CH_3SO_3)_2 +2H^+Zn^0+2CH_3SO_3H$

Thus, it should be especially recognized that by employing cerium in contemplated batteries various advantageous properties may be achieved. Among other things, the standard redox potential of the elements in contemplated redox systems (e.g., Ce/Zn) will allow normal operation of such batteries even if the electrolyte from the anode and cathode compartment are mixed. As used herein, the term "mixed electrolyte" refers to an electrolyte in which the first and second element are present in the same compartment (i.e., anode and/or cathode compartment) under normal operating conditions (ie., when the battery is charged and/or discharged without substantial reduction (i.e., more than 10%) of electrode performance and/or battery capacity). The term "normal operating condition" as used herein specifically excludes operation during which a separator has been accidentally perforated (e.g., during charging).

With respect to the first element in the redox couple (here: Ce) it is contemplated that suitable elements need not necessarily be limited to cerium, and it is generally contemplated that alternative elements also include various lanthanides, and especially praseodymium, neodymium, terbium, and dysprosium. Alternatively, suitable lanthanides may also include samarium, europium, thulium and ytterbium.

Where a lanthanide other than cerium is employed as the redox partner for zinc, it is generally contemplated that the concentration of the alternative lanthanide will typically depend, among other factors, on the solubility of the particular lanthanide and/or the concentration of a complexing agent (e.g., counter ion, mono- or polydentate ligand, etc.). Thus, it is contemplated that suitable concentrations of contemplated non-cerium lanthanides will typically be in the range of 10 micromolar (and even less) up to the saturation concentration of the particular lanthanide (up to 3M, and even higher) in the electrolyte.

Furthermore, it should be recognized that the cost of production of contemplated batteries might be significantly reduced by employing mixtures of lanthanides (i.e., by adding at least one additional lanthanide to a lanthanide-zinc redox pair). For example, it is contemplated that suitable lanthanide mixtures include naturally occurring mixtures (e.g., Bastnasite or Monazite), enriched fractions (e.g., Cerium concentrate or Lanthanum concentrate), or mixtures with predetermined quantities of two or more lanthanides. Mixtures of lanthanides as redox partner with zinc are thought to be especially advantageous where such mixtures include elements with electrochemically similar behavior, or where such mixtures include a predominant fraction (e.g., greater than 80 mol %) of a lanthanide with a desired electrochemical behavior. Numerous further aspects of alternative first elements are described in PCT application entitled "Lanthanide Batteries" by Lewis Clarke, Brian J. Dougherty, Stephen Harrison, J. Peter Millington and Samaresh Mohanta, which was filed on or about Feb. 12, 2002, and which is incorporated by reference herein.

With respect to the amount of cerium, it is contemplated that the cerium ion concentration may vary considerably and may generally be in the range of between one micromolar (and even less) and the maximum saturation concentration of the particular cerium ion. However, it is preferred that the cerium ion concentration in the electrolyte is at least 0.2M, more preferably at least 0.5M, and most preferably at least 0.7M. Viewed from another perspective, it is contemplated that preferred cerium ion concentrations lie within 5–95% of the solubility maximum of cerium ions in the electrolyte at a pH<7 and 20° C.

It is further contemplated that the cerium ions may be introduced into the electrolyte in various chemical forms. However, it is preferred that cerium ions are added to the electrolyte solution in form of a salt, preferably cerium carbonate. However, numerous alternative chemical forms, including cerium hydrate, cerium acetate, or cerium sulfate are also contemplated.

With respect to the second element it is generally preferred that zinc is the redox partner for cerium (or other first element). However, it should be appreciated that numerous alternative elements are also suitable for use in conjunction with the teachings presented herein, and particularly preferred alternative elements include titanium and chromium. Other suitable elements include lead, mercury, cadmium, and/or tin. Similarly, the concentration of zinc ions in the electrolyte is at least 0.05M, preferably at least 0.1M, more preferably at least 0.3M, even more preferably at least 0.5M, and most preferably at least 1.2M. With respect to the particular form of zinc addition to the electrolyte, the same considerations as described above apply. Thus, contemplated zinc forms include $ZnCO_3$, ZnAcetate, $Zn(NO_3)_2$, etc.

In yet another aspect of the inventive subject matter, it is contemplated that the electrolyte need not be limited to a particular composition. However, it is generally preferred that suitable electrolytes are acid electrolytes (i.e., have a pH of less than 7.0), and it is contemplated that numerous organic and inorganic acids may be used.

It should be particularly recognized that suitable acids in the acid electrolyte may vary considerably. However, it is generally preferred that contemplated acids will be able to dissolve (i.e. to form complex bonds with) at least one ionic species in the redox couple, Especially contemplated acids will (a) form a complex bond with the oxidized element in the cathode compartment, and (b) deprotonate upon formation of the complex bond with the oxidized element. Viewed from another perspective, it should be appreciated that preferred acids exchange a proton for a complex bond with the oxidized element in the cathode compartment. Still further, it is preferred that the anion of the acid not only forms a complex bond with the oxidized element in the cathode compartment, but also forms a complex bond with the reduced element in the cathode compartment.

Similarly, it is contemplated that the same type of acid may also be employed in the anode compartment, wherein the anion of the acid will form a complex bond with at least one of the oxidized and reduced form of the element in the anode compartment. However, it should be appreciated that the element in the anode compartment may also be reduced to an electroneutral element (e.g., plated as a metal). Furthermore, while it is generally preferred that the anode and cathode compartment include the same type of acid, it should also be recognized that the acids in the anode and cathode compartments may be chemically distinct. Thus, suitable acids include organic and inorganic acids, and any reasonable combination thereof.

Consequently, it should be recognized that suitable acids in contemplated acid electrolytes not only provide a particular pH for a particular redox couple, but also exhibit at least one of two additional functions. The first additional function of contemplated acids is to increase the solubility of at least one of the first and second elements of the redox couple by forming a complex bond with the at least one of the first and second elements in the oxidized and/or reduced state. The second additional function of contemplated acids is to provide a source of protons that is liberated from the acid in response to oxidation of the redox element in the cathode compartment. Thus, it should be recognized that the protons from an acid in the acid electrolyte in the cathode compartment will increase acidity in the anode compartment, and especially proximal to the separator such that dendrites forming from the anode during charging will disintegrate.

An especially preferred organic acid that dissolves ceric and cerous ions (as well as other high energy redox ions, e.g., $Ti^{3+}$, or $Cr^{2+}$) at a relatively high concentration is methane sulfonic acid at a relatively high concentration (i.e., at least 50 mM, more preferably at least 100 mM, and most preferably at least 1M). With respect to the concentration of the MSA or other acid it should be appreciated that a particular concentration of MSA is not limiting to the inventive subject matter. However, a particularly preferred concentration of methane sulfonic acid is in the range of between 1M and 4M, and more preferably between 2.5M and 3.5M. In further alternative aspects of the inventive subject matter, it is contemplated that EDTA or alternative chelating agents could replace at least a portion, if not all of the methane sulfonic acid in at least the zinc cathode part of the cell.

Alternative organic acids include trifluoromethane sulfonic acid ($CF_3SO_3H$), which may make a better solvent anion than methane sulfonic acid for ceric ions and would make an excellent high energy battery for special applications. Still further contemplated acids include inorganic acids such as perchloric acid ($HClO_4$), nitric acid, hydrochloric acid (HCl), or sulfuric acid ($H_2SO_4$). However, such alternative acids may impose safety concerns or exhibit less advantageous capability to dissolve high concentrations of ceric ions.

In still further alternative aspects, it is contemplated that the electrolyte may also be gelled, and that preferred gelled electrolytes include one or more anions of an organic or inorganic acid. Various suitable methods and compositions for gelled electrolytes are disclosed in the PCT patent application entitled "Improved Battery With Gelled Electrolyte" by Lewis Clarke, Brian J. Dougherty, Stephen Harrison, J. Peter Millington and Samaresh Mohanta, which was filed on or about Feb. 12, 2002, which is incorporated herein by reference.

While in some battery configurations a NAFION™ (copolymer of perfluorosulfonic acid and polytetrafluoroethylene) membrane may operate more satisfactorily than other membranes, it is generally contemplated that the exact physical and/or chemical nature of the membrane is not limiting to the inventive subject matter so long as such membranes allow $H^+$ exchange between an anode and cathode compartment in contemplated acidic electrolytes. Consequently, it should be appreciated that numerous alternative membranes other than NAFION™ are also suitable, and exemplary membranes include all known solid polymer electrolyte membranes, or similar materials.

Moreover, it should be especially recognized that in contemplated batteries membranes are suitable for use even if such membranes exhibit some leakage or permeability for catholyte and/or anolyte into the opposite compartment, since contemplated batteries are operable even under conditions in which the electrolytes are mixed (supra). Various aspects of mixed electrolytes in contemplated batteries are disclosed in the PCT patent application entitled "Mixed Electrolyte Battery" by Lewis Clarke, Brian J. Dougherty, Stephen Harrison, J. Peter Millington and Samaresh Mohanta, which was filed on or about Feb. 12, 2002, which is incorporated herein by reference.

With respect to the cell it is contemplated that the particular forms and material will be at least partially determined by the particular function of the battery. However, it is generally contemplated that the cell is fabricated from a material having sufficient chemical stability to withstand the electrochemical processes and acidity of contemplated batteries without structural damage that would result in significant loss of battery function (e.g., loss of electrolyte, leaking of material components into the electrolyte and subsequent plating or precipitation of such materials, etc.). Thus, particularly preferred materials include acid resistant high-density polymers, which may or may not be coated.

In yet further alternative aspects of the inventive subject matter, it is contemplated that suitable batteries may be configured in a battery stack in which a series of battery cells are electrically coupled to each other via a bipolar electrode. The particular nature of the bipolar electrode is not limiting to the inventive subject matter, and it is generally contemplated that any material that allows for oxidation of cerous ions to ceric ions during charging (and the reverse reaction during discharge) and plating/de-plating of zinc is suitable for use herein. However, a particularly preferred material for a bipolar electrode is glassy carbon (carbon that exhibits has no long-range order in three dimensions). The inventors surprisingly discovered that glassy carbon provides, despite operation in a highly acidic electrolyte, an excellent substrate for plating of zinc during charging. Furthermore, glassy carbon is a relatively inexpensive and comparably light-weight material, thereby further improving the ratio of cost/weight to capacity. Various contemplated aspects of bipolar electrodes are disclosed in US provisional patent application with the title "Electric Devices With Improved Bipolar Electrode" by Lewis Clarke, Brian J. Dougherty, Stephen Harrison, J. Peter Millington and Samaresh Mohanta, which was filed on or about Feb. 12, 2002, which is incorporated by reference herein.

Particularly useful applications of the inventive subject matter presented herein include the use of contemplated electrolytes and electrodes in various battery types. For example, where the capacity of contemplated batteries is relatively high, it is contemplated that such electrolytes and electrodes may be employed in various load-leveling and stand-by battery configurations. On the other hand, contemplated electrolytes and electrodes may also be employed in primary and secondary battery types that are useful for household, automotive, and other uses where a relatively small battery capacity is required. Various aspects of configurations and use of contemplated batteries with especially high capacity is described in pending PCT application with the title "improved load leveling battery and methods therefor", serial number PCT/US01/41678, which is incorporated by reference herein.

Experiments

To validate the concept of a secondary battery with autolytic dendrites, a cell was constructed by using four blocks of plastic Ultra High Molecular Weight Polyethylene (UHMWP), with gaskets in between each face, two electrodes, and one Nafion® membrane. Electrolyte inlets and outlets were made in the center sections and electrolyte was fed from two small tanks via a peristaltic pump into the respective compartments.

The cerium solution contained 106 grams $Ce_2(CO_3)_3$ *$5H_2O$ in 480 ml methane sulfonic acid and 320 ml of water. The zinc solution contained 65 grams zinc carbonate in 240 ml methane sulfonic acid and 160 ml of water. The ceric solution was fed to the cathode made of coated titanium mesh ($TiO_2$), and the zinc solution was fed to the anode. Cell gap was 2.54 cm, flow rate about 2 liter per minute.

The cell was charged at 0.5A (current density is 50 $mA/cm^2$) for five hours. The colorless cerous methane sulfonate turned yellow and the open circuit cell voltage was 3.33 volts. Only 3 grams of zinc would have been deposited by this time if the cell were running at 100% current efficiency. The cell was further run overnight at 0.2A current and an additional 5 hours at 0.5 A. The open circuit voltage maximum was 2.46 V and the voltage across the cell during charging at 0.5 A was 2.7 V. To investigate the current efficiency, the cell was emptied and the anode side was inspected. The anode side contained approximately 9 grams of zinc, which is in very close agreement with the theoretical value expected for the charge passed. The zinc was placed in the electrolyte and the rate of spontaneous dissolving of the zinc was relatively slow. About 50% of the zinc was still observed after two hours, and some residual zinc remained after 72 hours.

After numerous charge/discharge cycles, growth of zinc dendrites at the anode was observed while the battery was charged. Surprisingly, however, substantially all of the dendrites disintegrated prior to contact with the separator. While not whishing to be bound by any particular theory of hypothesis, the inventors contemplate that the dendrites are disintegrated under the influence of e relatively high $H^+$ concentration proximal to the separator. Consequently, it should be appreciated that the zinc dendrites in contemplated secondary batteries disintegrate at an increasing rate when charging of the battery is increased.

Still further, very little gassing at the anode or cathode was observed during the charging process. Most of the zinc formed granular nodules on the titanium anode and eventually plated on the face of the membrane, while the ceric cathode appeared to be substantially free of deposits.

Thus, specific embodiments and applications of mixed electrolyte batteries have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A battery comprising:
    a cell with an acid electrolyte, wherein the cell is at least partially divided by a $H^+$ permeable separator into an anode compartment and a cathode compartment;
    wherein the acid electrolyte in the anode compartment comprises zinc, and wherein the acid electrolyte in the cathode compartment comprises an element that is oxidized during charging of the battery, and wherein oxidation of the zinc and reduction of the oxidized element produce current provided by the battery;
    wherein the acid electrolyte comprises an acid that has a chemical composition effective to form a salt with the oxidized element in an amount effective to increase an $H^+$ concentration in the cathode compartment sufficient to promote an $H^+$ flux into the anode compartment across the separator; and
    wherein the separator is configured such that the $H^+$ flux across the separator is sufficient to disintegrate a zinc dendrite proximal to the separator.

2. The battery of claim 1 wherein the acid electrolyte comprises an organic acid.

3. The battery of claim 1 wherein the acid electrolyte comprises an acid selected from the group consisting of methane sulfonic acid, trifluoromethane sulfonic acid, perchloric acid, nitric acid, hydrochloric acid, and sulfuric acid.

4. The battery of claim 1 wherein the $H^+$ permeable separator comprises a perfluorinated polymer.

5. The battery of claim 1 wherein the element in the cathode compartment is a lanthanide.

6. The battery of claim 5 wherein the lanthanide is selected from the group consisting of cerium, samarium, and europium.

7. The battery of claim 2 wherein the organic acid is methane sulfonic acid and the element in the cathode compartment is cerium.

8. The battery of claim 2 wherein the organic acid is present in the cathode compartment at a concentration of between 1M and 4M.

9. The battery of claim 2 wherein the organic acid is present in the cathode compartment at a concentration of between 2.5M and 3.5M.

10. The battery of claim 2 wherein the organic acid is present in the anode compartment at a concentration of at least 2.5M and forms a salt with oxidized zinc upon discharge of the battery.

11. A battery comprising an anode, a cathode, a separator, and an acid electrolyte in which zinc and a lanthanide form a redox pair, wherein the battery is configured such that during charging of the battery a $H^+$ flux is generated across the separator that disintegrates a zinc dendrite proximal to the separator, and wherein oxidation of the zinc and reduction of the lanthanide produce current provided by the battery.

12. The battery of claim 11 wherein the lanthanide is selected from the group consisting of cerium, samarium, and europium.

13. The battery of claim 11 wherein the electrolyte comprises methane sulfonic acid, wherein charging of the battery oxidizes $Ce^{3+}$ to $Ce^{4+}$, and wherein the methane sulfonic acid complexes $Ce^{4+}$ thereby releasing $H^+$ that passes through the separator.

14. The battery of claim 11 wherein the acid electrolyte is a mixed electrolyte, and wherein the mixed electrolyte contacts at least one of the anode and cathode.

* * * * *